Aug. 25, 1936.  E. E. HEWITT  2,052,177
BRAKE VALVE DEVICE
Filed Oct. 10, 1934
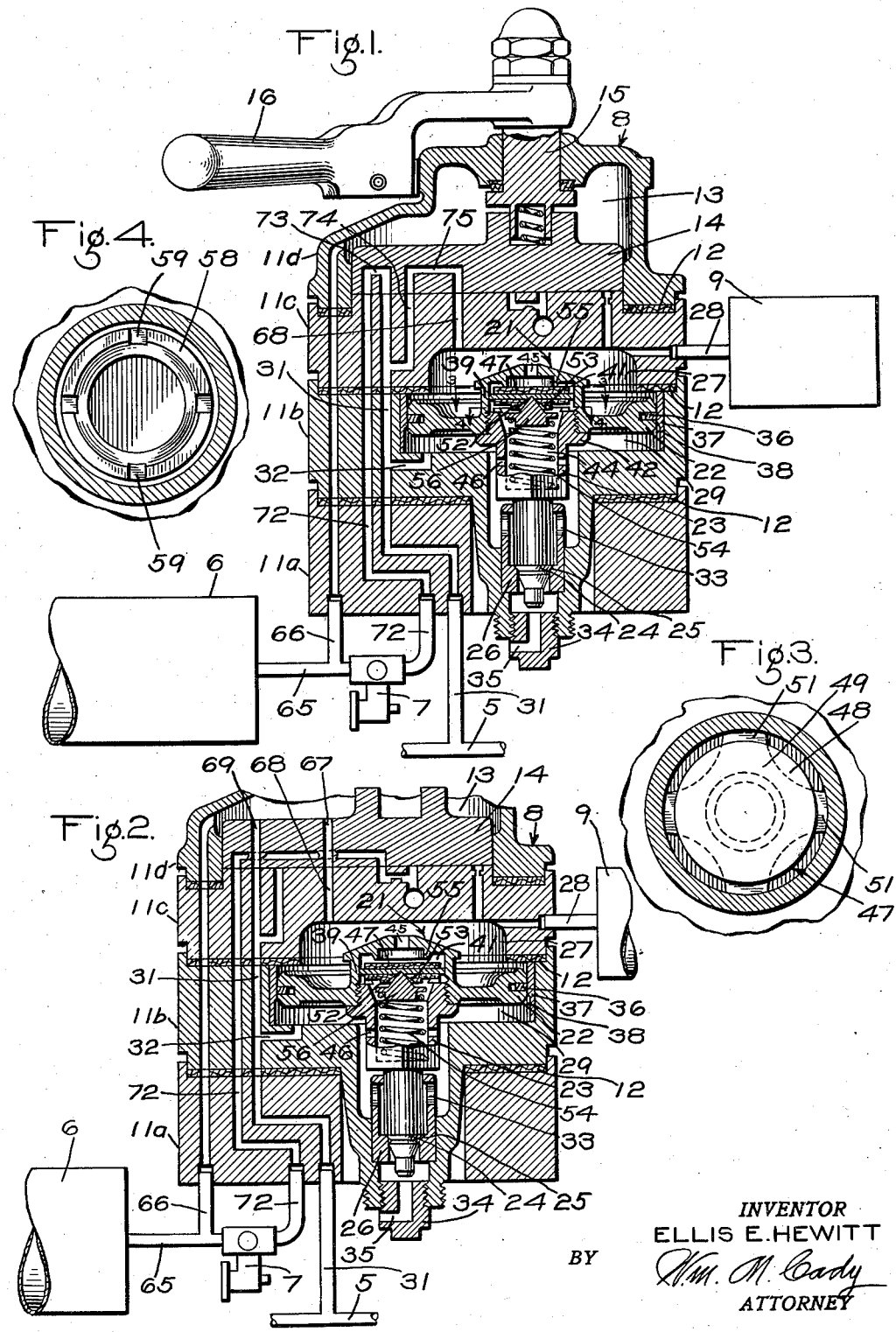
INVENTOR
ELLIS E. HEWITT
BY
Wm. M. Cady
ATTORNEY Patented Aug. 25, 1936

2,052,177

UNITED STATES PATENT OFFICE 2,052,177

BRAKE VALVE DEVICE

Ellis E. Hewitt, Edgewood, Pa., assignor to The Westinghouse Air Brake Company, Wilmerding, Pa., a corporation of Pennsylvania Application October 10, 1934, Serial No. 747,732

5 Claims. (Cl. 303—55)

This invention relates to brake valve devices employed in fluid pressure brake systems, and particularly to the construction of the equalizing piston of a brake valve device, which piston functions to operate a discharge valve for controlling the discharge of air from the brake pipe in effecting a service application of the brakes.

Owing to the well known difficulties resulting from an overcharge of the equalizing reservoir when the brake pipe is being charged or recharged, brake valve devices now in commercial use are provided with a so-called "collapsible" equalizing piston. The collapsible equalizing piston comprises a piston mounted in close slidable relation on a stem adapted to actuate a discharge valve for the brake pipe, a spring being disposed between the piston and the stem so that, if after the discharge valve is closed by downward movement of the equalizing piston, there is more than a predetermined differential of pressure effective in the equalizing chamber above the piston, the piston may continue to move downwardly, against the spring pressure, relative to the stem and thereby uncover by-pass grooves around the piston in the walls of the piston chamber. Thus, flow of fluid under pressure may be effected through the by-pass grooves from the chamber above the equalizing piston, which chamber is open to the equalizing reservoir, to the chamber below the equalizing piston, which latter chamber is open to the brake pipe, so that substantial equalization is effected between the two chambers.

It will be understood that substantial equalization of the fluid under pressure in the equalizing reservoir and in the brake pipe enables a substantially instantaneous responsive movement of the equalizing piston upon a reduction in the pressure of the fluid in the equalizing reservoir so that a corresponding reduction in brake pipe pressure to effect a service application of the brakes is substantially immediately initiated.

The collapsible equalizing piston is subject to the disadvantage of wear at the sliding jointure of the piston and the stem, which wear eventually results in a loose fit permitting canting of the piston with respect to the stem. Leakage of fluid under pressure past the piston from the brake pipe may, therefore, result as well as scoring or uneven wear of the piston chamber wall. Furthermore, if a dirt particle or particle of pipe scale lodges in any of the by-pass grooves, above the piston, when the piston is in a collapsed position, the piston may not be able to return upwardly. In this case, the brake valve device is rendered incapable of effecting a reduction in brake pipe pressure and a consequent service application of the brakes, in view of the fact that the equalizing piston cannot open the discharge valve to reduce the pressure in the brake pipe.

It is an object of my invention to provide an improved means for preventing overcharge of the equalizing reservoir, in which a high degree of reliability of operation is assured.

Another object of my invention is to provide an equalizing piston device of such construction that it may be readily and simply assembled without danger of injuring the parts of a check valve assembled therein.

The above and other objects of my invention which will be made apparent hereinafter, are attained by means of an embodiment of my invention described hereinafter and illustrated in the accompanying drawing, wherein, Figure 1 is a view, showing parts of a fluid pressure brake system, and including a brake valve device mainly in section and embodying my invention, the brake valve device being shown in the running position thereof, Figure 2 is a view corresponding to Figure 1, showing the brake valve device in the release position thereof, Figure 3 is a view, taken on line 3—3 of Figure 1, and Figure 4 is a sectional view, taken on line 4—4 of Figure 1.

Referring to Figure 1, the structure shown includes a brake pipe 5, a main reservoir 6, a feed valve device 7, a brake valve device 8 and an equalizing reservoir 9.

The brake valve device 8 may comprise a plurality of casing sections 11a, 11b, 11c, and 11d having gaskets 12 interposed therebetween and secured together in any suitable manner, as by bolts, not shown, the uppermost casing section 11d enclosing a chamber 13 having a rotary valve 14 therein which may be moved to various positions through the medium of a stem 15 extending exteriorly of the casing section from the chamber 13 and provided with an operating handle 16.

As in the usual construction of a brake valve device, the brake valve device 8 further includes an equalizing piston device 21, having a piston 22 and a stem 23, which piston device is adapted to operate a brake pipe discharge valve 24. Above the piston 22 is a chamber 27, hereinafter called the equalizing chamber, which is open to the equalizing reservoir 9, in the usual manner, through a passage and pipe 28, and beneath the piston 22 is a chamber 29 open to the brake pipe 5, in the usual manner, through pipe and passage 31 and branch passage 32. The discharge valve 24 seats on a valve seat 25 formed on a bushing 26 fitted into the casing section 11b, which bushing serves to support and guide the stem 23 and which is provided with suitable ports 3 therein, through which communication is established from the brake pipe 5 and chamber 29 to atmosphere when the discharge valve 24 is unseated. A choke plug 34, having a passage 35 therein, is provided as is usual, for effecting a reduction in brake pipe pressure at the usual service rate upon the opening of the discharge valve 24.

The piston 22 is provided in the usual manner with a piston ring 36 adapted to engage the surface of a cylindrical bushing 37 lining the chamber 29. It should be understood that in converting an older type brake valve device to embody my invention, it is not necessary to replace the bushing 37, and therefore the bushing 37 is illustrated as having by-pass grooves 38 formed on the interior surface thereof. The by-pass grooves 38 do not interfere with the operation, since the piston ring 36 of the piston 22 does not pass below the upper extremity of the groove 38.

According to my invention, the piston 22 and the stem 23 of the piston device 21 are separately formed, the piston 22 having an integral hub 39 extending to one side thereof, in which is a chamber or bore 41 provided with threads in the outer portion thereof for receiving the threaded end portion of the stem 23, the stem 23 being provided with an annular flange 42 surrounding the threaded end thereof, which clamps against the under face of the piston when the parts are screwed together. The piston stem 23 may be provided with a hexagonal or other polygonal portion adapted to receive a wrench or other tool and contains a longitudinally extending bore 44, opening at the end thereof into the bore or chamber 41 in the hub 39 of the piston 22.

The hub 39 of the piston 22 has an axially extending opening or port 45 in the end thereof, establishing communication between the equalizing chamber 27 and the chamber 41 in the hub portion, and the stem 23 is provided with suitable ports 46 therein establishing communication between the bore 44 in the stem and the chamber 29 beneath the equalizing piston 22. A passage through the piston and stem for the flow of fluid under pressure from one side to the other side of the piston 22 is thus provided.

A disc check valve 47 for controlling the flow of fluid under pressure through the piston from the equalizing chamber 27 to the chamber 29 beneath the piston, is disposed within the chamber 41 of the hub 39 of the equalizing piston 22.

The check valve 47 comprises a substantially cylindrical portion 48 of relatively soft resilient material, such as rubber or rubber composition, and a reinforcing guide disc 49 of relatively hard material, such as metal, embedded in the portion 48 and formed so as to provide a plurality of lugs 51 projecting beyond the outer periphery of the portion 48, which lugs engage the casing wall of the bore 41 in the hub 39 of the piston 22 to guide the valve in its movement. Integrally formed on one face of the cylindrical portion 48 of the valve 47 is an annular raised portion 52 having a conical recess 53 therein, which extends to and uncovers a central portion of the reinforcing disc 49.

The disc check valve 47 is adapted to be resiliently urged or biased by a spring 54, into seated engagement on an annular rib seat 55 formed on the interior surface of the chamber 41 in the hub 39 surrounding the orifice of the port 45. One end of the spring 54 engages the end of the bore 44 in the stem 23 and the other end of the spring engages an annular flange on a conical-shaped follower 56, the apex of which is rounded and which extends into the recess 53 and into metal-to-metal engagement with the reinforcing guide disc 49 of the valve 47, limited universal movement of the valve on the follower being permitted for effecting proper seating of the valve on its seat.

Opening movement of the valve 47 is limited by an annular rib seat 58 (see Figure 4) formed on the end of the piston stem 23 which projects into the chamber 41, transverse grooves or slots 59 being formed in the face thereof for permitting the flow of fluid under pressure past the valve 47 into the bore 44 of the stem, when the back side of the valve is in engagement with the rib seat 58.

It will be noted that the disc check valve 47 is of relatively large diameter and that the annular rib seat 55 is of such diameter as to cause the inner seated area of the check valve 47 to be a relatively large proportion of the total area of the valve. Thus, a relatively large pressure area is provided on the valve, so that the force exerted thereon by the pressure of fluid in the equalizing chamber 27, as supplied to said valve through the port 45, is relatively large. Accordingly, the loading or biasing spring 54 is relatively stiffly tensioned in order to maintain the valve 47 seated on the annular rib seat 55 against the normal fluid pressure in equalizing chamber 27 acting to open the valve, the tension being such, however, as to permit opening movement of the valve 47 away from its seat when the pressure in the equalizing chamber 27 exceeds that beneath the piston by a predetermined amount.

It will thus be seen that even though a piece of scale or dirt particle intervenes between the annular rib seat 55 and the valve 47, the tension of the spring 54 will be sufficient to compress the scale or dirt particle into the relatively soft seating portion 48 of the valve, and notwithstanding the presence of this scale or dirt particle, effect a tight seal.

When the equalizing piston device 21 is assembled, the disc check valve 47 is first inserted in the bore 41 of the hub 39 of the piston 22, and then the stem 23, with the spring 54 and follower 56 disposed in the bore 44 thereof, is screwed into the bore 41 until the flange 42 tightly grips the piston face in sealing contact. Obviously, the process of assembly is a simple one and since the check valve is positioned in the bore 41 in guiding contact with the cylindrical wall of the bore before the parts are assembled, there is no danger of pinching or injuring the portion 48 of the valve 47 when the parts of the piston device are assembled.

When the brake valve handle is moved to full release position, as shown in Figure 2, fluid under pressure is supplied directly from the main reservoir 6 to the equalizing chamber 27 and equalizing reservoir 9 through pipe 65, branch pipe and passage 66, rotary valve chamber 13, port 67 in the rotary valve 14 and passage 68, the brake pipe being also simultaneously supplied with fluid under pressure directly from the main reservoir through a port 69 in the rotary valve 14 and passage and pipe 31. The chamber 29 beneath the piston 22, being open to the passage 31 through branch passage 32, is also supplied with fluid under pressure from the main reservoir.

If, as a result of supplying fluid at main reservoir pressure to the equalizing chamber and to the brake pipe, the pressure in the equalizing chamber acting on the inner seated area of the valve 47 should rise above that in the brake pipe acting in chamber 29, sufficiently to overcome the pressure of the spring 54, the valve 47 will be unseated.

When the valve 47 is thus unseated from the annular rib seat 55, fluid under pressure from the equalizing chamber 27 flows through the port 45, past the annular rib seat 55, past the valve 47 between the guide lugs 51, through the transverse grooves 59 in the face of the annular rib seat 58, the bore 44 of the stem 23, ports 46 in the stem 23, chamber 29, branch passage 32, and passage and pipe 31, into the brake pipe 5.

The flow of fluid under pressure from the equalizing reservoir 9 and equalizing chamber 27 past the check valve 47, continues until the pressures of the fluid on opposite sides of the piston 22 have equalized to such an extent that the pressure in the equalizing chamber 27 is insufficient to overcome the tension of spring 54 and maintain the valve 47 in unseated position. When such substantial equalization occurs, the spring 54 returns the valve 47 into seated relation on the annular seat rib 55, further communication between the equalizing chamber 27 and the chamber 29 past the check valve 47, being thereby cut off.

Thus, even if the brake valve device is moved immediately from release position to service position, as would be the case when a train is descending a long grade and the brake valve device is momentarily operated to release position to recharge or partly recharge the auxiliary reservoirs and then immediately returned to a service application position, the pressures in the equalizing reservoir and in the brake pipe are sufficiently equalized, so that the usual reduction in the pressure of the fluid in the equalizing chamber and equalizing reservoir, effected when the brake valve device is in service application position, is effective to cause an immediate responsive movement of the equalizing piston to open the discharge valve 24 and permit a reduction in brake pipe pressure at a service rate.

In the running position of the brake valve device 8, shown in Fig. 1, the check valve 47 is maintained in closed position on the valve seat 55, because, as is usual, with the brake valve device in running position, the equalizing chamber 27, the equalizing reservoir 9, and the brake pipe 5 are charged with fluid at the same pressure, fluid under pressure being supplied to the brake pipe 5 through the feed valve device 7, pipe and passage 72, cavity 73 in the rotary valve 14, and passage and pipe 31, and fluid under pressure from the feed valve device 7 being supplied to the equalizing chamber and equalizing reservoir from passage 31 through branch passage 74, cavity 75 in the rotary valve 14, and passage 68.

It is deemed unnecessary to further explain the operation and function of the brake valve device in as much as it functions in the usual and well known manner aside from the operation of check valve 47 in the equalizing piston thereof.

The advantages inherent in the construction of the equalizing piston and the check valve device therein, which I have devised, should now be apparent. In view of the relatively soft, resilient character of the seating face of the check valve, permitting scale or dirt particles to be pressed thereinto, as well as in view of the relatively stiff tension of the loading spring for reseating the check valve upon its seat, despite the interposition of scale or dirt particles between the valve and its seat, the possibility of failure of the brake valve device to function to effect a discharge of fluid from the brake pipe when moved to service application position, is rendered less likely and greater reliability of operation of the brake is therefore assured. The construction of the equalizing piston, which I have devised, is furthermore of such character that it may be readily and simply assembled without danger of pinching or injuring the disc check valve so that its sealing qualities are impaired, and without requiring special tools or care and skill on the part of the person assembling the parts of the equalizing piston. In addition, the construction of the equalizing piston is of such simplicity that the cost of manufacture is relatively low. Also the construction of the equalizing piston which I have devised, is such as to enable older types of brake valve devices to be converted into a type employing my equalizing piston, by merely substituting my equalizing piston for the older type of equalizing piston, no other changes in the brake valve casing structure being required. The cost of converting old equipment is thus maintained at a minimum.

While I have disclosed but one embodiment of my invention, it should be understood that various changes, omissions, or additions may be made therein without departing from the spirit thereof, and it is, therefore, not my intention to limit the scope of my invention, except as necessitated by the prior art and as defined in the appended claims.

Having now described my invention, what I claim as new and desire to secure by Letters Patent, is:

1. An equalizing discharge valve mechanism for fluid pressure brakes comprising a piston having an axially disposed valve chamber, a discharge valve, a stem for said valve axially secured to said piston, and a disc valve guidably mounted in said valve chamber and operable to permit flow of fluid from one side of the piston to the other, the opening movement of said disc valve being limited by engagement of the valve with the end of said stem.

2. An equalizing discharge piston device for fluid pressure brakes comprising a piston and a stem separably joined together, the piston device having a passage therein through which fluid may flow from one side to the other of the piston, said passage including a chamber in said piston, into which chamber projects one end of the stem, and a loaded check valve device, having a disc valve which is guided in the chamber in said piston and which is adapted to seat on a valve seat in the said chamber to close the said passage through the piston device, the end of the stem projecting into the said chamber being adapted to limit the opening movement of the said valve away from its seat.

3. An equalizing discharge piston device for fluid pressure brakes comprising a piston and a stem separably joined together, the piston device having a passage therein through which fluid may flow from one side to the other of the piston, said passage including a chamber in said piston, into which chamber projects one end of the stem, and a loaded check valve device, having a disc valve which is guided in the chamber in said piston and which is adapted to seat on a valve seat in the said chamber to close the said passage through the piston device, the end of the stem projecting into the said chamber being adapted to limit the opening movement of the said valve away from its seat, and having at least one transverse groove therein adapted to permit the flow of fluid past the said valve when the valve engages the end of the said stem.

4. An equalizing discharge piston device for fluid pressure brakes comprising a piston and a stem, the piston having an integral hub portion extending away from one face of the piston and containing a bore opening at the opposite face of the piston, the said stem being separably secured to said piston and having one end projecting into the said bore, said piston and said stem having a passage therethrough including the bore in said piston through which fluid may flow from one side of the piston to the other, and a loaded check valve device having a disc valve guided in the bore of the hub portion of said piston, said hub portion of the piston having a valve seat within the bore thereof adapted to be engaged by the said valve to close the said passage from one side to the other side of the piston, the opening movement of the valve away from its seat being limited by the end of the stem which projects into the bore.

5. A piston device for operating the discharge valve of a brake valve device, comprising a piston having a chamber therein, a discharge valve operating stem axially secured to said piston and having one end extending into the chamber of the piston, a valve seat on the piston within the chamber in spaced axial relation to the end of the stem, a disc valve guided in the chamber for movement between the valve seat and the end of the stem, and yieldably urged into seated relation on the valve seat to close a communication through which fluid under pressure may flow from one side to the other of the piston, the end of the stem within the chamber serving as a stop to limit the opening movement of the disc valve away from the valve seat.

ELLIS E. HEWITT.